United States Patent
Chen (10) Patent No.: US 9,995,816 B2
(45) Date of Patent: Jun. 12, 2018

(54) METHODS FOR INDOOR POSITIONING AND APPARATUSES USING THE SAME

(71) Applicant: Wistron Corp., New Taipei (TW)

(72) Inventor: Chih-Ming Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 445 days.

(21) Appl. No.: 14/597,101

(22) Filed: Jan. 14, 2015

(65) Prior Publication Data

US 2016/0084646 A1    Mar. 24, 2016

(30) Foreign Application Priority Data

Sep. 24, 2014  (TW) .............................. 103132926 A (51) Int. Cl.
*G01B 21/00*   (2006.01)
*G06N 99/00*   (2010.01)
*G01S 5/02*    (2010.01)

(52) U.S. Cl.
CPC ............ *G01S 5/0236* (2013.01); *G01S 5/021* (2013.01); *G01S 5/0226* (2013.01); *G01S 5/0242* (2013.01); *G06N 99/005* (2013.01)

(58) Field of Classification Search
CPC ...... B60W 30/09; G01S 5/021; G01S 5/0226; G01S 5/0236; G01S 5/0242; G06N 99/005; G08G 1/163; H04W 12/10; H04W 4/046; H04W 4/22

USPC ......... 702/150, 152; 250/389; 370/252, 315, 370/388, 259; 340/998; 455/456, 5, 405, 455/406, 456.5

See application file for complete search history.

(56) References Cited

U.S. PATENT DOCUMENTS

| 5,347,132 A | 9/1994 | Holzman et al. |
| 8,019,352 B2 * | 9/2011 | Rappaport ............ G01S 5/0252 340/988 |
| 9,414,239 B2 * | 8/2016 | Brunk ................... H04W 24/00 |

FOREIGN PATENT DOCUMENTS

| CN | 102595592 A | 7/2012 |
| CN | 102984745 A | 3/2013 |
| CN | 103220777 A | 7/2013 |
| CN | 103813448 A | 5/2014 |

* cited by examiner

*Primary Examiner* — John H Le (57) ABSTRACT

The invention introduces a method for indoor positioning, executed by a processing unit of a first reference node, which contains at least the following steps. Broadcast signals of second reference nodes are listened. Signal measurements of the broadcast signals are obtained. Identification information is obtained from broadcast messages sent by the second reference nodes. A distance associated with each identification information is obtained. A MLM (Machine Learning Model) is updated according to the signal measurements and the distances, where the MLM describes a linear function between signal measurements and distances.

14 Claims, 10 Drawing Sheets

METHODS FOR INDOOR POSITIONING AND APPARATUSES USING THE SAME

CROSS REFERENCE TO RELATED APPLICATIONS

This application claims priority of Taiwan Patent Application No. 103132926, filed on Sep. 24, 2014, the entirety of which is incorporated by reference herein.

BACKGROUND

Technical Field

The present invention relates to a positioning technology, and in particular, to methods for indoor positioning and apparatuses using the same.

Description of the Related Art

Conventional indoor positioning depends on wireless communications devices with angle-detection units, such as WiFi or Bluetooth devices, and achieves a high precision by an angle-of-arrival measurement. However, when a heavy deployment to cover a wide range of space is needed, it is not only expensive but also consumes excessive battery power to equip such wireless communications devices. Thus, it is desirable to have methods for indoor positioning and apparatuses using the same to reduce the deployment cost and the battery power consumption.

BRIEF SUMMARY

An embodiment of the invention introduces a method for indoor positioning, executed by a processing unit of a first reference node, which contains at least the following steps. Broadcast signals of second reference nodes are listened to. Signal measurements of the broadcast signals are obtained. Identification information is obtained from broadcast messages sent by the second reference nodes. A distance associated with each identification information is obtained. A MLM (Machine Learning Model) is updated according to the signal measurements and the distances, where the MLM describes a linear function between signal measurements and distances.

An embodiment of the invention introduces a method for indoor positioning, executed by a processing unit of a first reference node, which contains at least the following steps. A first MLM is generated. Second MLMs are collected from second reference nodes. An average MLM is calculated according to the second MLMs and the difference between the first MLM and the average MLM is calculated. It is determined whether the difference exceeds a threshold value, and when the difference exceeds the threshold value, the first MLM stored in a memory is overwritten with the average MLM, where the average MLM describes a linear function between signal measurements and distances.

An embodiment of the invention introduces a system for indoor positioning, which contains at least a communications interface and a processing unit. The processing unit, coupled to the communications interface, listens to broadcast signals of second reference nodes via the communications interface; obtains signal measurements of the broadcast signals; obtains identification information from broadcast messages sent by the second reference nodes; obtains a distance associated with each identification information; and updates a MLM according to the signal measurements and the distances, where the MLM describes a linear function between signal measurements and distances.

An embodiment of the invention introduces a system for indoor positioning, which contains at least a communications interface, a memory and a processing unit. The memory stores a first MLM. The processing unit, coupled to the communications interface and the memory, generates the first MLM; stores the first MLM in the memory; collects second MLMs from second reference nodes via the communications interface; calculates an average MLM according to the second MLMs; calculates the difference between the first MLM and the average MLM; and determines whether the difference exceeds a threshold value. When the difference exceeds the threshold value, the processing unit overwrites the first MLM stored in the memory with the average MLM, where the average MLM describes a linear function between signal measurements and distances.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
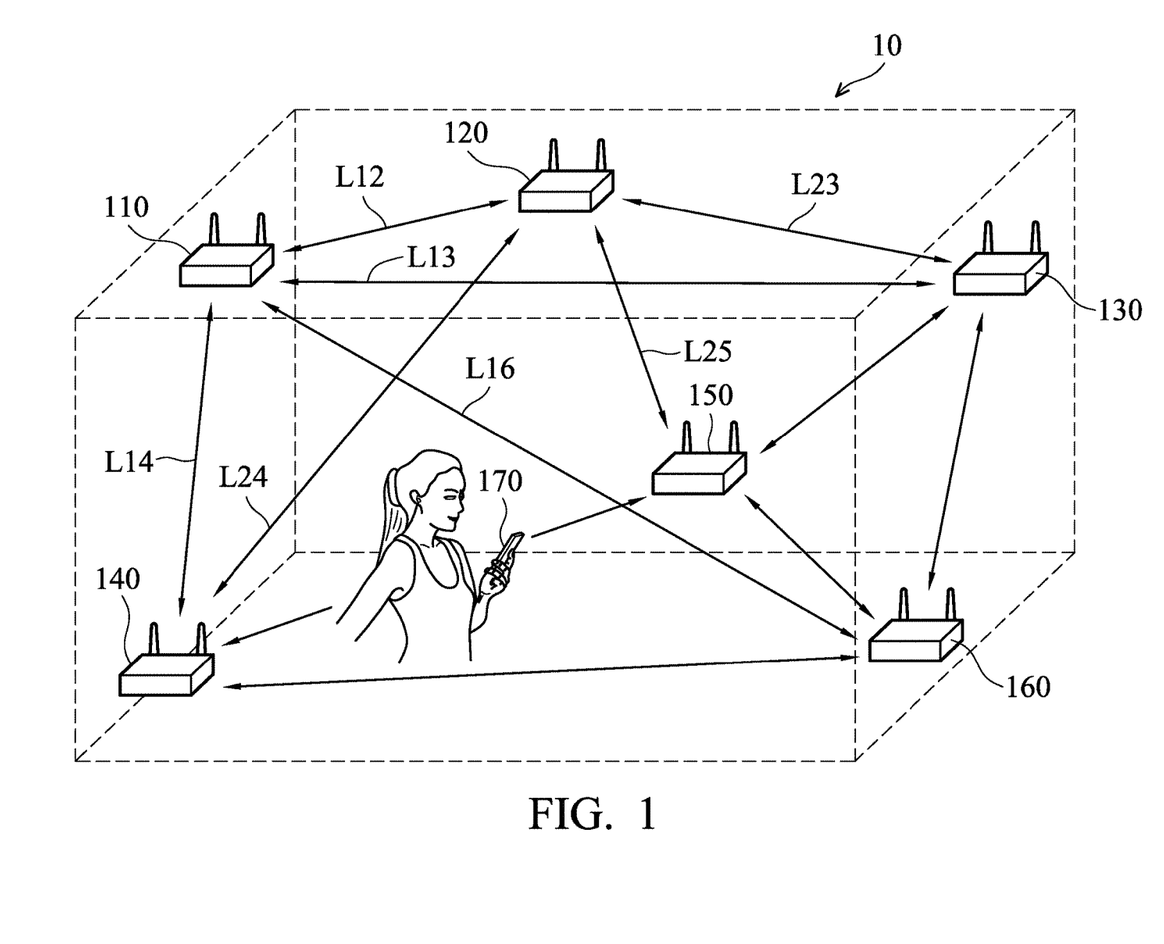
FIG. 1 is a schematic diagram of an indoor positioning system according to an embodiment of the invention.

FIG. 1 is a schematic diagram of an indoor positioning system according to an embodiment of the invention. For example, since six wireless apparatuses 110 to 160 are equipped in a three-dimensional space, a user carrying a mobile apparatus 170 may know his current position with the help of the wireless apparatuses 110 to 160 when wandering around a three-dimensional space. The mobile apparatus 170 may be a mobile phone, a tablet computer, a notebook computer, etc. In order to reduce the deployment cost and battery power consumption, none of the wireless apparatuses 110 to 160 includes an expensive angle-detection unit. The indoor positioning system 10 may be practiced in the cloud computing architecture of Apache® Storm, the mobile apparatus 170 may contain a spout server and a bolt server, and each of the wireless apparatuses 110 to 160 may contain a bolt server. Those skilled in the art will understand that the cloud computing architecture of Apache® Storm can perform real-time big data computing to improve the precision of the indoor positioning. Each of the wireless apparatuses 110 to 160 may operate on an OS (Operating System), such as TinyOS, and be referred to as a reference node. The mobile apparatus 170 may operate on an OS, such as Apple iOS, Google Android, Microsoft Windows, etc., and be referred to as a blind node.

Figure 2:
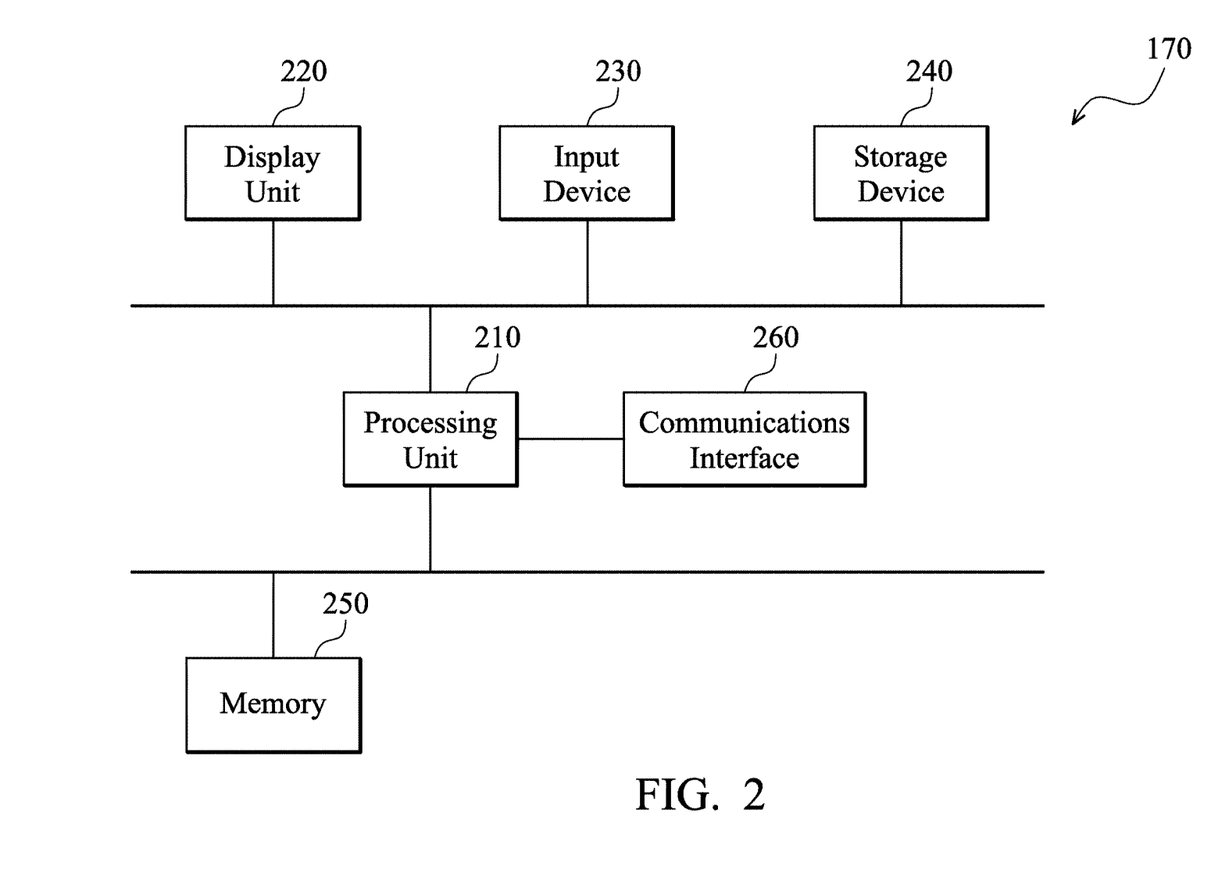
FIG. 2 is the system architecture of a computer apparatus according to an embodiment of the invention.

FIG. 2 is the system architecture of a computer apparatus according to an embodiment of the invention. The system architecture may be practiced in the mobile apparatus 170, at least including a processing unit 210. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage unit 240 for storing a wide range of electronic files, such as Web pages, documents, video files, audio files, and others. A communications interface 260 is included in the system architecture and the processing unit 210 can thereby communicate with other electronic apparatuses. The communications interface 260 may be a ZigBee module with a low-cost and a low-battery-power-consumption. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 220, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for a user to view.

Figure 3:
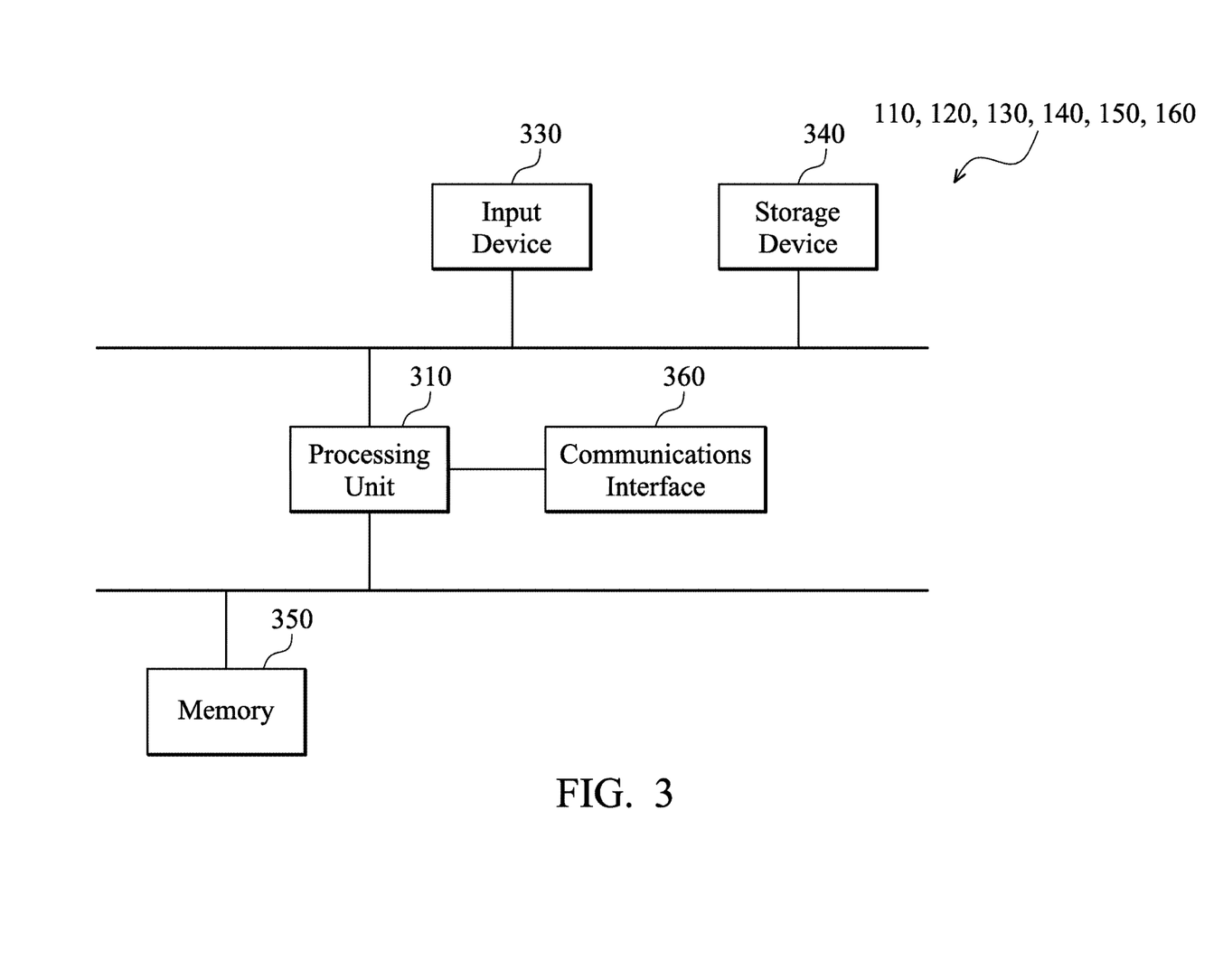
FIG. 3 is the system architecture of a computer apparatus according to an embodiment of the invention.

FIG. 3 is the system architecture of a computer apparatus according to an embodiment of the invention. The system architecture may be practiced in each of the wireless apparatuses 110 to 160, at least including a processing unit 310. The processing unit 310 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 350 for storing necessary data in execution, such as variables, data tables, a MLM (Machine Learning Model) or others, and a storage unit 340 for storing a wide range of electronic files. A communications interface 360 is included in the system architecture and the processing unit 310 can thereby communicate with other wireless apparatuses. The communications interface 360 may be a ZigBee module with a low-cost and a low-battery-power-consumption.

Figure 4:
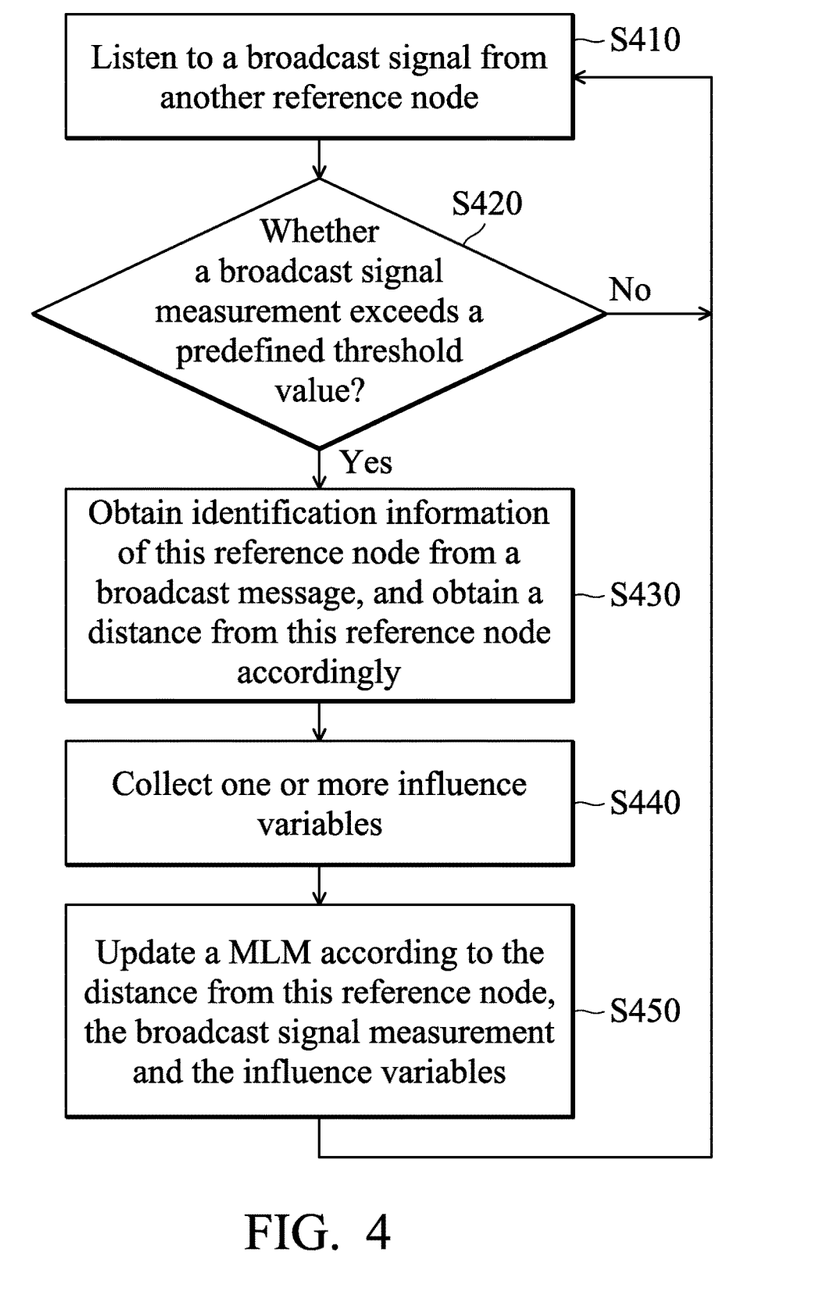
FIG. 4 is a flowchart illustrating a method for generating a MLM (Machine Learning Model), performed by a processing unit of a reference node, according to an embodiment of the invention.
Figure 5:
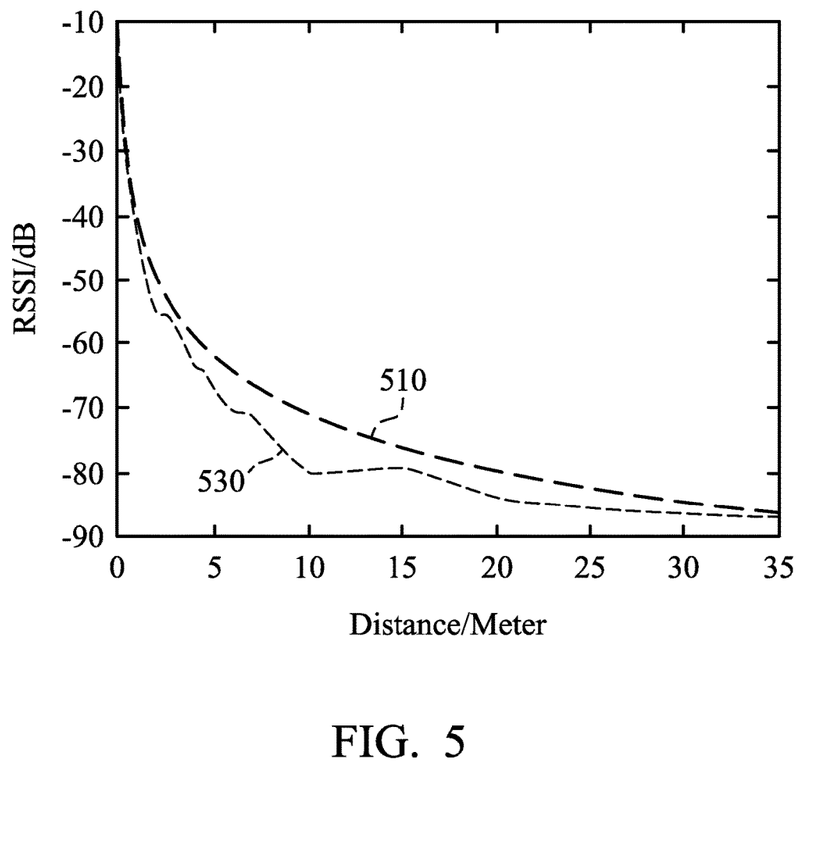
FIG. 5 is an exemplary MLM describing a linear function between distances and RSSIs according to an embodiment of the invention.

Each of the reference nodes 110 to 160 is installed at a fixed location and knows actual lengths from the other nodes. Each reference node may store actual lengths from the other nodes in a data table of the storage device 340. Refer to FIG. 1. For example, the length between the reference nodes 110 and 120 is given as L12, a length between the reference nodes 110 and 130 is given as L13, a length between the reference nodes 110 and 140 is given as L14 and a length between the reference nodes 110 and 160 is given as L16. A length between the reference nodes 120 and 110 is given as L12, a length between the reference nodes 120 and 130 is given as L23, a length between the reference nodes 120 and 140 is given as L24 and a length between the reference nodes 120 and 150 is given as L25. Each of reference nodes 110 to 160 periodically broadcasts its information to the other reference nodes, such as a device identification, a network address, three-dimensional coordinates (x-coordinate, y-coordinate, z-coordinate), etc., and periodically listens to information broadcasted by the other reference nodes to obtain signal measurements of the other reference nodes, such as RSSIs (Received Signal Strength Indications), LQIs (Link Quality Indicators), etc. Each reference node may filter out the signal measurements lower than a threshold value. Each reference node may generate a MLM according to the given lengths from the other reference nodes and the obtained signal measurements of the other reference nodes. FIG. 4 is a flowchart illustrating a method for generating a MLM, performed by the processing unit 310 of a reference node, according to an embodiment of the invention. After listening to a broadcast signal from another reference node via the communications interface 360 (step S410), the processing unit 310 determines whether a broadcast signal measurement exceeds a predefined threshold value, such as a RSSI, a LQI, etc. (step S420). If not, then the process continues the next run of the listening (step S410). If so, then the processing unit 310 obtains identification information of this reference node from a broadcast message, such as a device identification, a network address, etc., and accordingly obtains a distance from this reference node (step S430). The device identification may be a SSID (Service Set Identifier), and the broadcast message may be a beacon packet. In step S430, the processing unit 310 obtains the given length associated with the obtained identification information according to the stored information of the storage device 340. Next, the processing unit 310 may collect one or more influence variables, such as temperature, humidity, device aging and any combination thereof (step S440) and update a MLM according to the distance from this reference node, the broadcast signal measurement and the influence variables (step S450). In step S450, the influence variables may be grouped by a linear classification algorithm, such as the perception, the passive aggressive, the confidence weighted learning, the AROW (Adaptive Regularization Of Weight vectors), etc., and a mapping between the broadcast signal measurement and the distance is estimated by a linear regression estimation. FIG. 5 is an exemplary MLM describing a linear function between distances and RSSIs according to an embodiment of the invention. Initially, each reference node has a theoretical MLM 510. After a series of data collections and model updates (steps S410 to S450), the actual MLM is modified as a curve 530. In some embodiments, those skilled in the art may practice the MLM to describe a linear function between distances and another kind of signal measurement, such as LQI.

Figure 6:
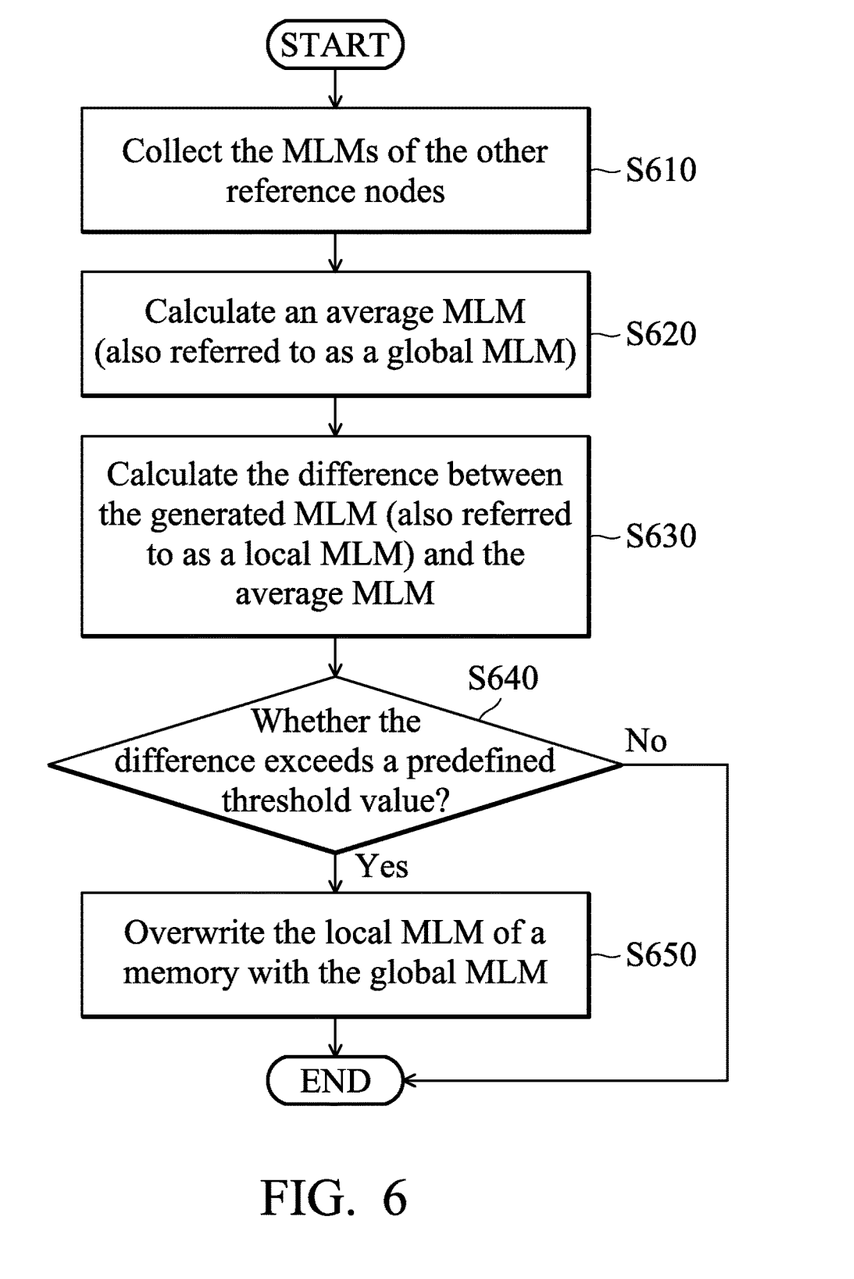
FIG. 6 is a flowchart illustrating a method for updating a bias MLM, performed by a processing unit of a reference node, according to an embodiment of the invention.

FIG. 6 is a flowchart illustrating a method for updating a bias MLM, performed by the processing unit 310 of a reference node, according to an embodiment of the invention. The method is used to prevent a bias MLM from being generated because of an exceptional error. The processing unit 310 of each of the reference nodes 110 to 160 may collect the MLMs of the other reference nodes via the communications interface 360 (step S610), and calculate an average MLM accordingly (also referred to as a global MLM) (step S620). In step S610, the reference nodes 110 to 160 may exchange the MLMs with each other using a proprietary protocol. Next, the difference between the generated MLM (also referred to as a local MLM) and the average MLM is calculated (step S630) and it is determined whether the difference exceeds a predefined threshold value (step S640). If so, the processing unit 310 overwrites the local MLM of the memory 350 with the global MLM (step S650); otherwise, the whole process ends.

Figure 7:
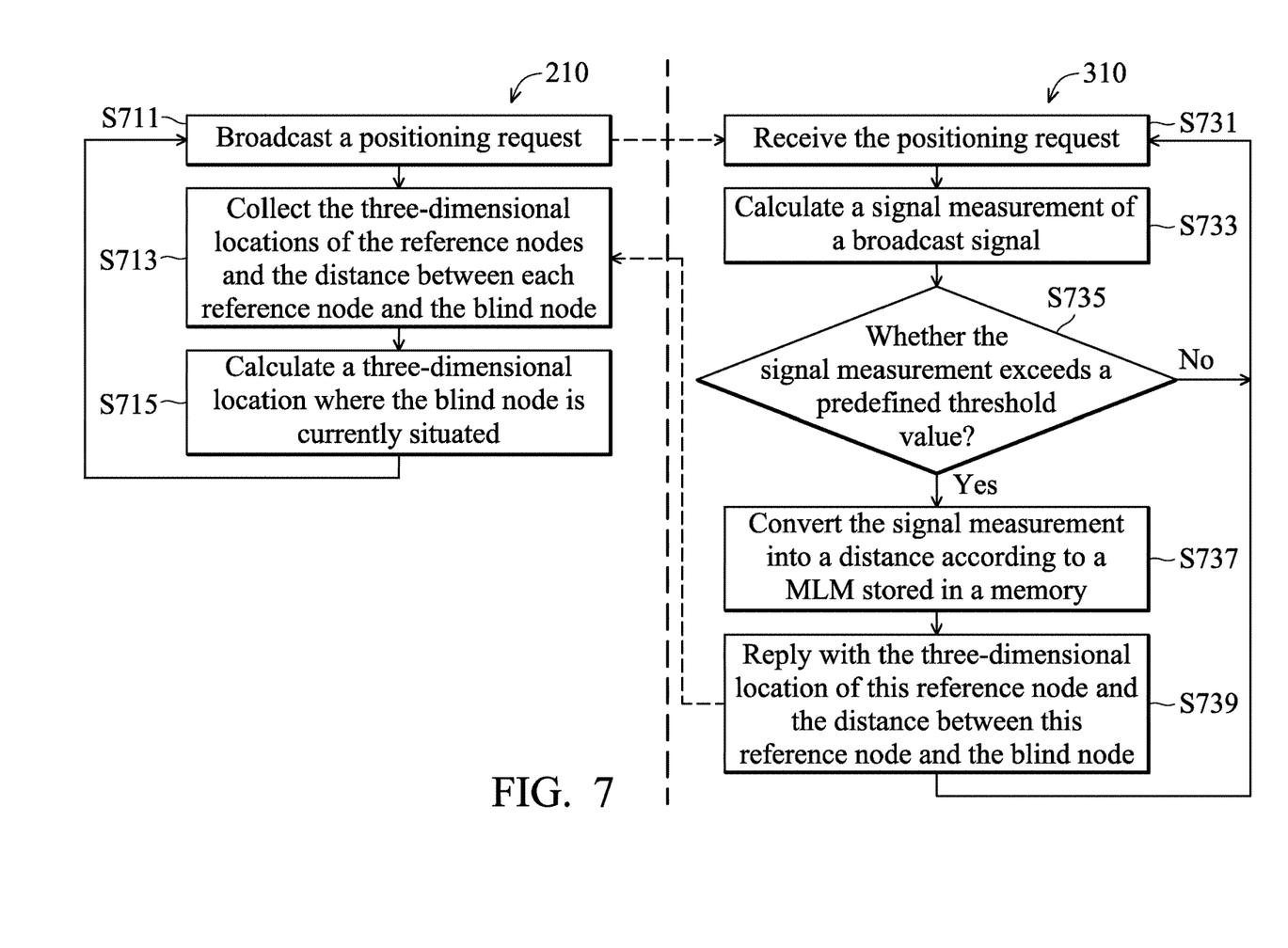
FIG. 7 is a flowchart illustrating a positioning method, performed by a processing unit of a blind node and a processing unit of a reference node in coordination, according to an embodiment of the invention.
Figure 8:
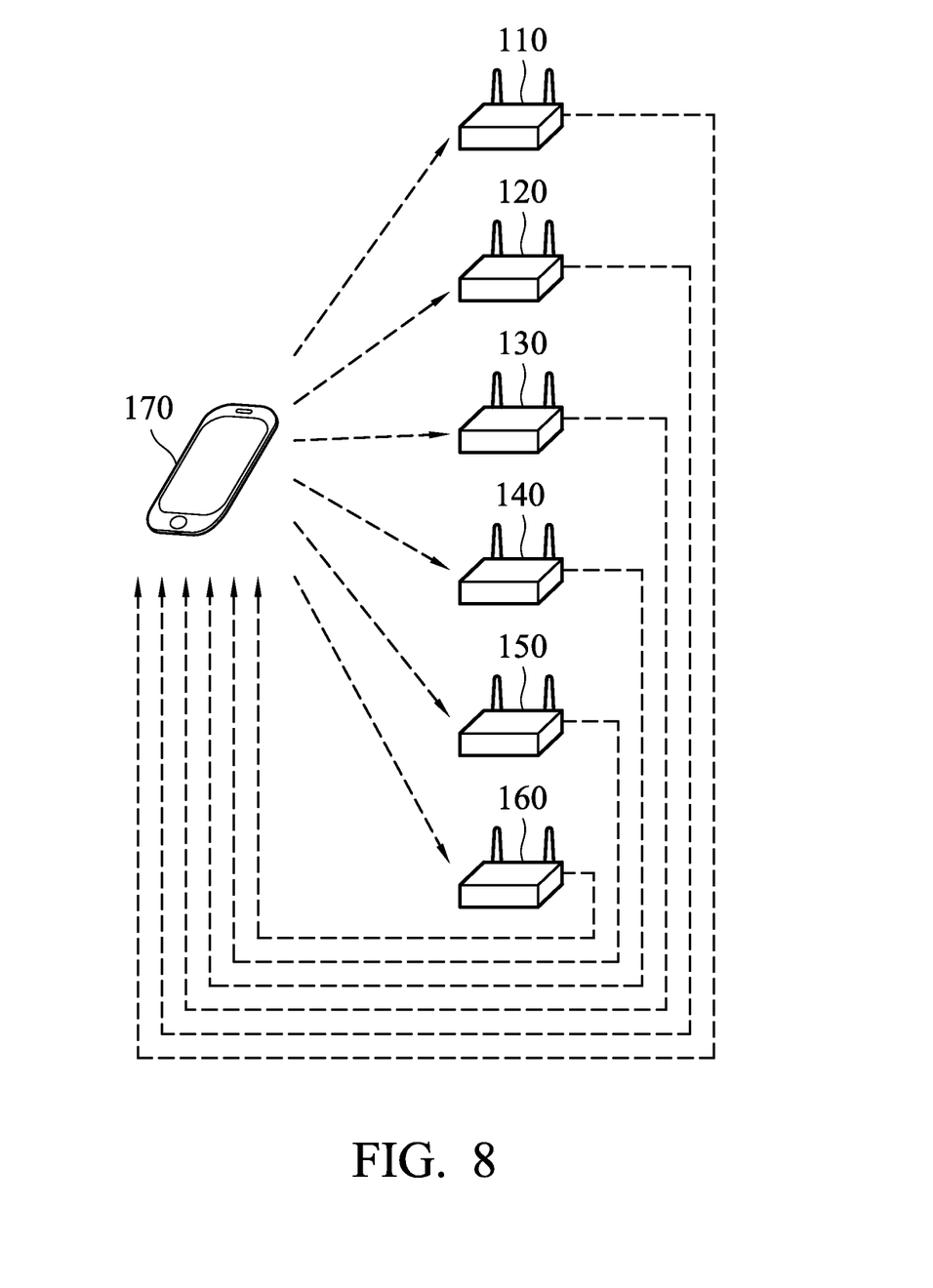
FIG. 8 is a schematic diagram illustrating an indoor navigation according to an embodiment of the invention.

The following illustrates an application scenario for indoor navigation to explain a positioning method according to an embodiment of the invention. FIG. 7 is a flowchart illustrating a positioning method, performed by the processing unit 210 of a blind node and the processing unit 310 of a reference node in coordination, according to an embodiment of the invention. The processing unit 210 periodically broadcasts a positioning request via the communications interface 260 (step S711). After receiving the positioning request via the communications interface 360 (step S731), the processing unit 310 of any of the reference nodes 110 to 160 calculates a signal measurement of a broadcast signal, such as a RSSI, a LQI, etc. (step S733) and determines whether the signal measurement exceeds a predefined threshold value (step S735). If not, the positioning request is omitted. If so, the signal measurement is converted into a distance according to a MLM stored in the memory 350 (step S737), and then the three-dimensional location of this reference node and the distance between this reference node and the blind node 170 are sent in reply to the blind node 170 via the communications interface 360 (step S739). After collecting the three-dimensional locations of the reference nodes 110 to 160 and the distance between each reference node and the blind node 170 via the communications interface 260 (step S713), the processing unit 210 of the blind node 170 calculates a three-dimensional location where the blind node 170 is currently situated (step S715). In step S715, the processing unit 210 may use a trilateration algorithm to calculate the three-dimensional location according to the three-dimensional locations of at least three reference nodes and the distances thereof. Finally, the calculated three-dimensional location is provided to an indoor navigation application to update the current location of the blind node 170 on an indoor map, so as to help a user to visualize the surrounding environment via a GUI (Graphical User Interface). FIG. 8 is a schematic diagram illustrating an indoor navigation according to an embodiment of the invention. During the continuous movements of the blind node 170, a spout server executed by the processing unit 210 broadcasts positioning requests to the reference nodes 110 to 160 repeatedly (step S711). After determining that a signal measurement of the broadcast signal exceeds a predefined threshold value (the "Yes" path of step S735), a bolt server running in any of the reference nodes 110 to 160 converts the signal measurement into a distance according to the stored MLM (step S737) and replies with the three-dimensional location of this reference node and the distance from this reference node to the blind node 170 (step S739). After collecting the three-dimensional locations of the reference nodes 110 to 160 and the distances from the reference nodes 110 to 160 (step S713), a bolt server executed by the processing unit 210 calculates the three-dimensional location, which the blind node 170 is currently situated at (step S715).

Figure 9:
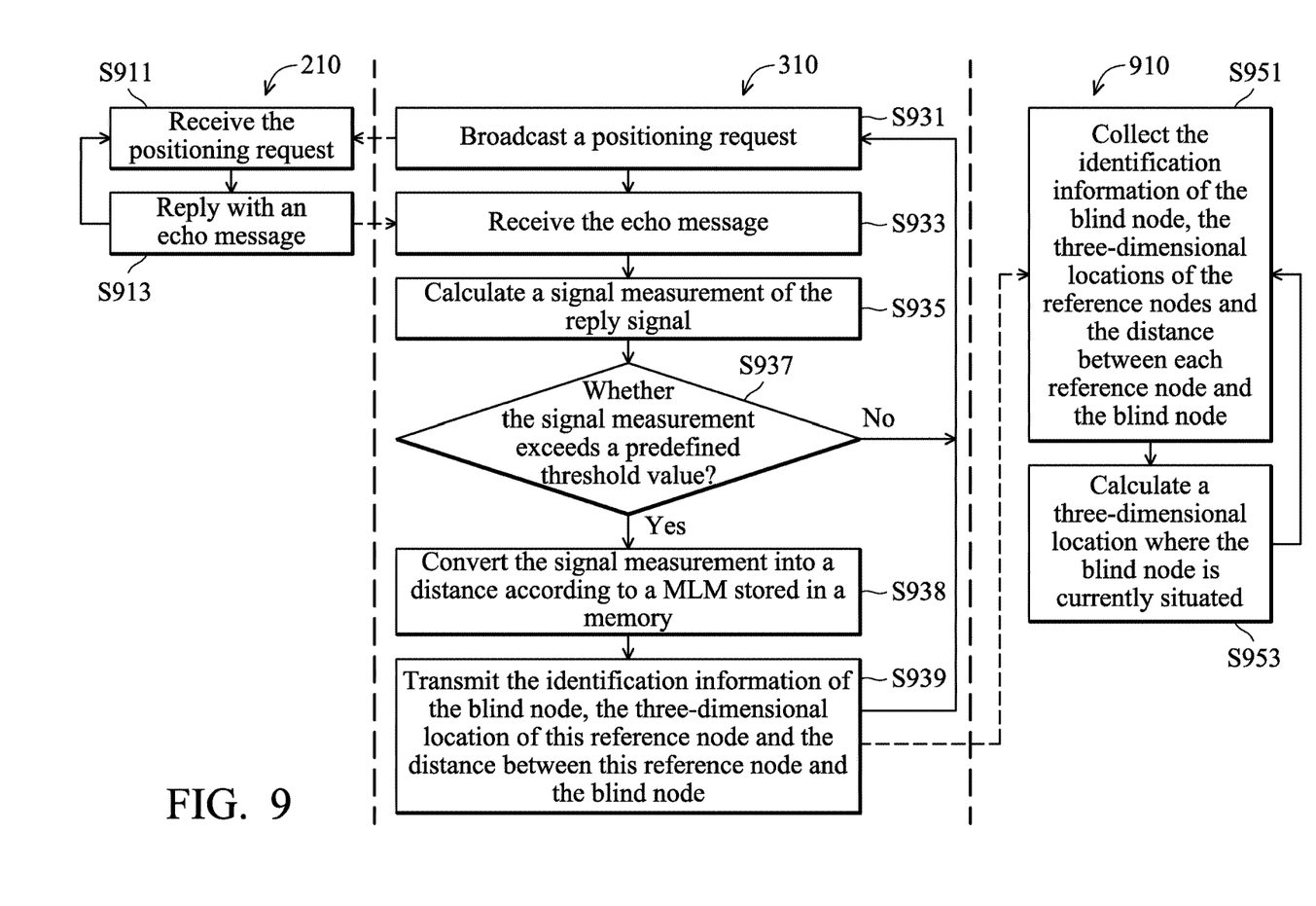
FIG. 9 is a flowchart illustrating a positioning method, performed by a processing unit of a blind node, a processing unit of a reference node and a processing unit of a positioning node in coordination, according to an embodiment of the invention.
Figure 10:
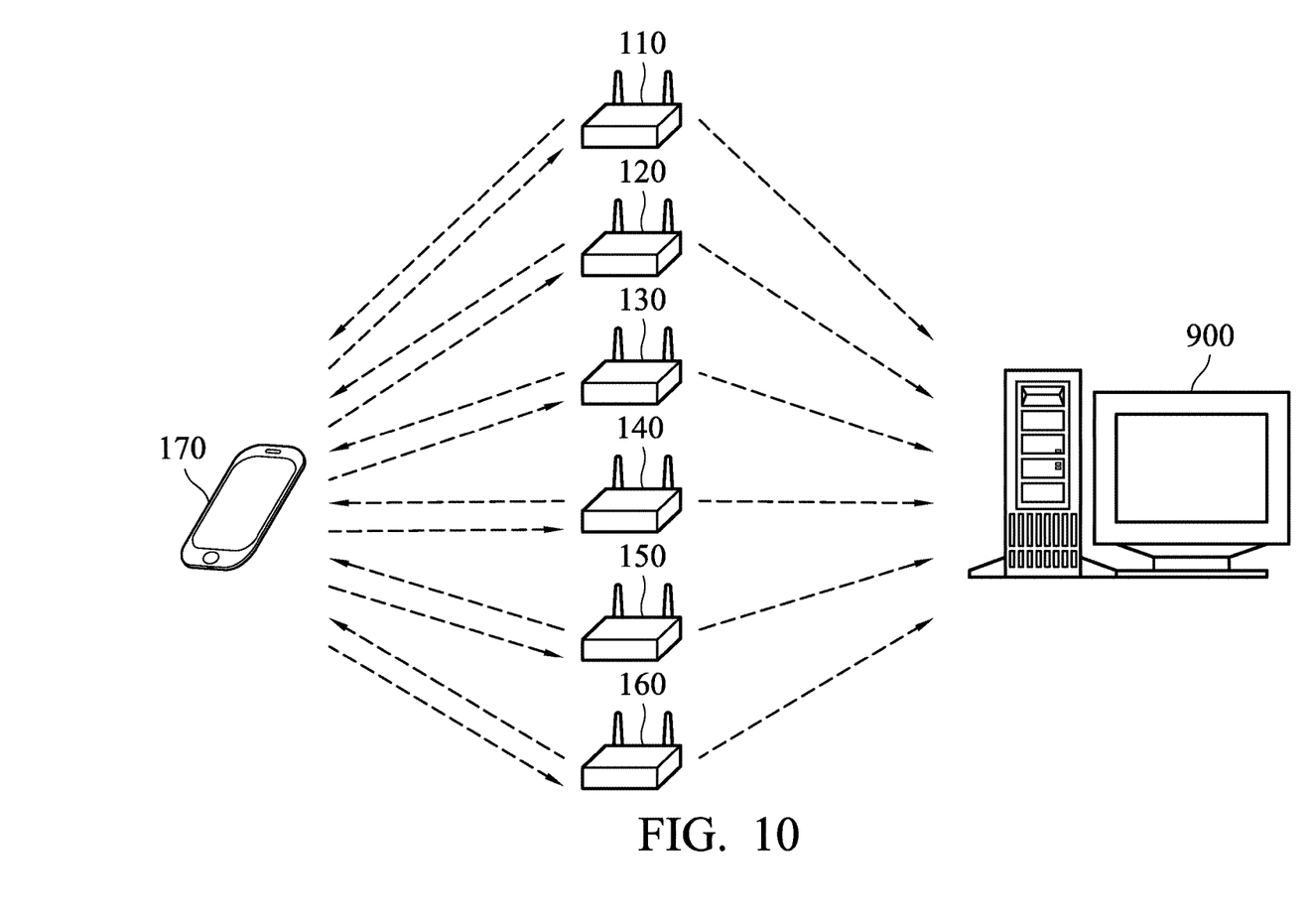
FIG. 10 is a schematic diagram illustrating an indoor tracking according to an embodiment of the invention.

The following illustrates an application scenario for indoor tracking to explain a positioning method according to an embodiment of the invention. FIG. 9 is a flowchart illustrating a positioning method, performed by the processing unit 210 of a blind node, the processing unit 310 of a reference node and a processing unit 910 of a positioning node in coordination, according to an embodiment of the invention. The positioning node may be implemented in a desktop computer and its hardware architecture may refer to the descriptions of FIG. 2. The processing unit 310 of any of the reference nodes 110 to 160 periodically broadcasts a positioning request including identification information of this reference node, such as a device identification, a network address, etc., via the communications interface 360 (step S931). After receiving the positioning request via the communications interface 260 (step S911), the processing unit 210 of the blind node 170 replies with an echo message including the identification information of the reference node carried in the positioning request, and identification information of the blind node 170, such as the device identification, network address, etc., via the communications interface 260 (step S913). After receiving the echo message via the communications interface 360 of any of the reference nodes 110 to 160 (step S933), the processing unit 310 of this reference node calculates a signal measurement of the reply signal, such as a RSSI, a LQI, etc. (step S935), and determines whether the signal measurement exceeds a predefined threshold value (step S937). If not, the echo message is omitted. If so, the signal measurement is converted into a distance according to a MLM stored in the memory 350 (step S938), and then the identification information of the blind node 170, the three-dimensional location of this reference node and the distance between this reference node and the blind node 170 are transmitted to the positioning node via the communications interface 360 (step S939). After collecting the identification information of the blind node 170, the three-dimensional locations of the reference nodes 110 to 160 and the distance between each reference node and the blind node 170 via a communications interface of the positioning node (step S951), the processing unit 910 of the positioning node calculates a three-dimensional location where the blind node 170 is currently situated (step S953). In step S953, the processing unit 910 may use a trilateration algorithm to calculate the situated three-dimensional location according to the three-dimensional locations of at least three reference nodes and the distances thereof. Finally, the calculated three-dimensional location is provided to an indoor tracking application to update the current location of the blind node 170 on an indoor map, so as to help a user to monitor, for example, the movement of a child via a GUI. FIG. 10 is a schematic diagram illustrating an indoor tracking according to an embodiment of the invention. A bolt server running in any of the reference nodes 110 to 160 periodically broadcasts a positioning request (step S931). During the continuous movements of the blind node 170, a spout server executed by the processing unit 210 replies with an echo message to the broadcast reference node (step S913) each time a positioning request is received (step S911). After determining that a signal measurement of the broadcast signal exceeds a predefined threshold value (the "Yes" path of step S937), the bolt server running in this reference node converts the signal measurement into a distance according to the stored MLM (step S938) and transmits the identification information of the blind node 170, the identification information and the three-dimensional location of this reference node and the distance between this reference node and the blind node 170 to a positioning node 900 (step S939). After collecting the identification information of the blind node 170, the identification information and the three-dimensional locations of the reference nodes 110 to 160, and the distance between each reference node and the blind node 170 (step S951), a bolt server executed by the processing unit 910 calculates the three-dimensional location, which the blind node 170 is currently situated at (step S953).

Although the embodiment has been described as having specific elements in FIGS. 2 and 3, it is noted that additional elements may be included to achieve better performance without departing from the spirit of the invention. While the process flows described in FIGS. 4, 6, 7 and 9 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for indoor positioning, executed by a processing unit of a first reference node to improve the precision of a calculation of a three-dimensional location of a blind node, comprising:
    listening to a plurality of first broadcast signals of a plurality of second reference nodes via a ZigBee module;
    obtaining a plurality of first signal measurements of the first broadcast signals;
    obtaining identification information from a plurality of broadcast messages sent by the second reference nodes via the ZigBee module;
    obtaining a first distance from the second reference node associated with each identification information;
    updating a first MLM (Machine Learning Model) according to the first signal measurements and the first distances, wherein the first MLM describes a linear function between signal measurements and distances;
    receiving a positioning request from the blind node via the ZigBee module;
    calculating a second signal measurement of a second broadcast signal of the blind node;
    converting the second signal measurement into a second distance from the blind node according to the first MLM; and
    sending a three-dimensional location of the first reference node and the second distance from the blind node in reply to the blind node via the ZigBee module, such that the blind node calculates the three-dimensional location of the blind node accordingly and uses the calculated three-dimensional location to update a current location of the blind node on an indoor map, so as to help a user to visualize the surrounding environment via the indoor map.

2. The method of claim 1, wherein the first signal measurement are RSSIs (Received Signal Strength Indications) or LQIs (Link Quality Indicators).

3. The method of claim 1, wherein the identification information is a device identification or a network address.

4. The method of claim 1, wherein the first distance associated with each identification information is obtained from a storage device.

5. The method of claim 1, further comprising:
    determining whether each first signal measurement exceeds a first threshold value; and
    when the first signal measurement exceeds the first threshold value, obtaining the corresponding identification information from the corresponding broadcast message sent by the corresponding second reference node.

6. The method of claim 5, further comprising:
    collecting a plurality of second MLMs from the second reference nodes;
    calculating an average MLM according to the second MLMs;
    calculating the difference between the first MLM and the average MLM;
    determining whether the difference exceeds a second threshold value; and
    when the difference exceeds the second threshold value, overwriting the first MLM stored in a memory with the average MLM.

7. A method for indoor positioning, executed by a processing unit of a first reference node to improve precision of a calculation of a three-dimensional location of a blind node, comprising:
    generating a first MLM (Machine Learning Model);
    collecting a plurality of second MLMs from a plurality of second reference nodes_ via a ZigBee module;
    calculating an average MLM according to the second MLMs;
    calculating the difference between the first MLM and the average MLM;
    determining whether the difference exceeds a threshold value;
    when the difference exceeds the threshold value, overwriting the first MLM stored in a memory with the average MLM, wherein each of the first MLM, the second MLMs and the average MLM describes a linear function between signal measurements and distances;
    receiving a positioning request from the blind node via the ZigBee module;

calculating a signal measurement of a broadcast signal of the blind node;

converting the signal measurement into a distance from the blind node according to the average MLM; and sending a three-dimensional location of the first reference node and the distance from the blind node in reply to the blind node via the ZigBee module, such that the blind node calculates the three-dimensional location of the blind node accordingly and uses the calculated three-dimensional location to update a current location of the blind node on an indoor map, so as to help a user to visualize the surrounding environment via the indoor map.

8. A system for indoor positioning improving the precision of a calculation of a three-dimensional location of a blind node, comprising:

a ZigBee module; and a processing unit, coupled to the ZigBee module, listening to a plurality of first broadcast signals of a plurality of second reference nodes via the ZigBee module; obtaining a plurality of first signal measurements of the first broadcast signals; obtaining identification information from a plurality of broadcast messages sent by the second reference nodes via the ZigBee module; obtaining a first distance from the second reference node associated with each identification information; updating a first MLM (Machine Learning Model) according to the first signal measurements and the first distances, wherein the first MLM describes a linear function between signal measurements and distances; receiving a positioning request from the blind node via the ZigBee module; calculating a second signal measurement of a second broadcast signal of the blind node; converting the second signal measurement into a second distance from the blind node according to the first MLM; and sending a three-dimensional location of the first reference node and the second distance from the blind node in reply to the blind node via the ZigBee module, such that the blind node calculates the three-dimensional location of the blind node accordingly and uses the calculated three-dimensional location to update a current location of the blind node on an indoor map, so as to help a user to visualize the surrounding environment via the indoor map.

9. The system of claim 8, wherein the first signal measurements are RSSIs (Received Signal Strength Indications) or LQIs (Link Quality Indicators).

10. The system of claim 8, wherein the identification information is a device identification or a network address.

11. The system of claim 8, further comprising:

a storage device, wherein the first distance associated with each identification information is obtained from the storage device.

12. The system of claim 8, wherein the processing unit determines whether each first signal measurement exceeds a first threshold value; and when the first signal measurement exceeds the first threshold value, obtains the corresponding identification information from the corresponding broadcast message sent by the corresponding second reference node.

13. The system of claim 12, further comprising:

a memory, storing the first MLM, wherein the processing unit collects a plurality of second MLMs from the second reference nodes; calculates an average MLM according to the second MLMs; calculates the difference between the first MLM and the average MLM; determines whether the difference exceeds a second threshold value; and when the difference exceeds the second threshold value, overwrites the first MLM stored in the memory with the average MLM.

14. A system for indoor positioning improving the precision of a calculation of a three-dimensional location of a blind node, comprising:

a ZigBee module;

a memory; and a processing unit, coupled to the ZigBee module and the memory, generating the first MLM (Machine Learning Model); storing the first MLM in the memory; collecting a plurality of second MLMs from a plurality of second reference nodes via the ZigBee module; calculating an average MLM according to the second MLMs; calculating the difference between the first MLM and the average MLM; determining whether the difference exceeds a threshold value; when the difference exceeds the threshold value, overwriting the first MLM stored in the memory with the average MLM, wherein each of the first MLM, the second MLMs and the average MLM describes a linear function between signal measurements and distances; receiving a positioning request from the blind node via the ZigBee module; calculating a signal measurement of a broadcast signal of the blind node; converting the signal measurement into a distance from the blind node according to the average MLM; and sending a three-dimensional location of the first reference node and the distance from the blind node in reply to the blind node via the ZigBee module, such that the blind node calculates the three-dimensional location of the blind node accordingly and uses the calculated three-dimensional location to update a current location of the blind node on an indoor map, so as to help a user to visualize the surrounding environment via the indoor map.

* * * * *